United States Patent
Benedikt et al.

[11] Patent Number: 5,249,468
[45] Date of Patent: Oct. 5, 1993

[54] PRESSURE SENSOR FOR DETECTING THE PRESSURE IN THE COMBUSTION CHAMBER OF INTERNAL COMBUSTION ENGINES

[75] Inventors: Walter Benedikt, Kornwestheim; Manfred Vogel, Ditzingen; Werner Herden, Gerlingen; Johann Konrad, Tamm; Wolfgang Schmidt, Vaihingen/Enz; Josef Tosch, Schwieberdingen; Matthias Kuesell, Korntal-Münchingen; Frank Stanglmeier, Möglingen, all of Fed. Rep. of Germany

[73] Assignee: Robert Bosch GmbH, Stuttgart, Fed. Rep. of Germany

[21] Appl. No.: 838,240
[22] PCT Filed: Jun. 27, 1991
[86] PCT No.: PCT/DE91/00523
§ 371 Date: Mar. 3, 1992
§ 102(e) Date: Mar. 3, 1992
[87] PCT Pub. No.: WO92/01912
PCT Pub. Date: Feb. 6, 1992

[30] Foreign Application Priority Data

Jul. 18, 1990 [DE] Fed. Rep. of Germany ....... 4022781
Feb. 7, 1991 [DE] Fed. Rep. of Germany ....... 4103704

[51] Int. Cl.$^5$ .............................. G01L 7/08; G01L 9/06
[52] U.S. Cl. ............................ 73/706; 73/115; 73/727; 73/756; 338/4
[58] Field of Search ............... 73/115, 727, 726, 708, 73/706, 720, 721, DIG. 4, 754, 756, 862.382, 862.632; 338/862.634, 4

[56] References Cited

U.S. PATENT DOCUMENTS

| 3,204,463 | 9/1965 | Taber ................................... 73/726 |
| 4,567,751 | 2/1986 | Ootsuka et al. .................... 73/35 |
| 4,839,708 | 6/1989 | Kano et al. ......................... 73/727 |
| 4,993,266 | 2/1991 | Omura et al. ...................... 73/720 |

FOREIGN PATENT DOCUMENTS

| 118229 | 12/1984 | European Pat. Off. |
| 0179278 | 4/1986 | European Pat. Off. |
| 172943 | 5/1986 | European Pat. Off. |
| 3125640 | 1/1983 | Fed. Rep. of Germany |
| 2626670 | 4/1989 | France |

Primary Examiner—Donald O. Woodiel
Attorney, Agent, or Firm—Michael J. Striker

[57] ABSTRACT

A pressure sensor for detecting pressure in a combustion chamber of internal combustion engines has a housing, a sensor element arranged in the housing and composed of a piezoresistive material, a diaphragm, and a punch arranged between the diaphragm and the sensor element and introducing a pressure to be determined onto the sensor element. The punch has an end facing the sensor element, at least the end of the punch is composed of relatively soft material.

15 Claims, 2 Drawing Sheets

PRESSURE SENSOR FOR DETECTING THE PRESSURE IN THE COMBUSTION CHAMBER OF INTERNAL COMBUSTION ENGINES

BACKGROUND OF THE INVENTION

The present invention relates to a pressure sensor.

More particularly the present invention relates to a pressure sensor which has a housing and a sensor element composed of a piezoresistive material and arranged in the housing. In the case of such a pressure sensor, known from German Offenlegungsschrift 31 25 640.6, the piezoresistive measuring elements, such as for example thick-film resistors of cermet, contactive plastic or metal, are printed on a base. The resistor element and the base are arranged as close as possible to the pressure chamber in order to be able to determine the prevailing pressure. Furthermore, the measuring signal is passed with the aid of electric leads to an electronic evaluation circuit arranged outside the housing of the pressure sensor. As a result, the piezoresistive elements and the electronic components have to be elaborately connected to one another with the aid of sheathed leads. Since the piezoresistive measuring element is exposed directly to the pressure, it is also exposed to the high temperatures prevailing in the combustion chamber. The flames spread there at a temperature of about 2000° C., whereby stresses can occur in the housing. As a result, the pressure signal is falsified by the high temperatures.

Furthermore, European Preliminary Published Specification 85 111 895.0 discloses a pressure sensor in which the thick-film resistor is arranged on the bottom of a base. However, this pressure sensor is intended only for determining the pressure in distributor pumps. The high temperatures prevailing in the combustion chamber would falsify the measuring signal in the case of this design as well.

SUMMARY OF THE INVENTION

Accordingly, it is an object of the present invention to provide a pressure sensor which avoids the disadvantages of the prior art.

In keeping with these objects and with others which will become apparent hereinafter, one feature of the present invention resides, briefly stated, in a pressure sensor in which between a diaphragm and a sensor element there is a punch which introduces a pressure to be determined onto said sensor element, and at least an end of the punch facing the piezoresistive sensor element is composed of a relatively soft material.

When the pressure sensor is designed in accordance with the present invention, it has the advantage that as uniform a force introduction as possible via the punch onto the piezoresistive measuring element is possible. It is possible to compensate for roughnesses occurring at the end of the punch. By the use of a relatively soft material for the punch, but in particular by the use of a soft material for the end of the punch facing the piezoresistive element, a uniform force introduction over the entire contact area is possible. If in this case the punch with a soft tip is pressed onto the glass layer surrounding the piezoresistive element under a pressure exceeding the pressure later to be determined, a virtually uninterrupted form fit is achieved between the end of the punch and the over-glazing of the piezoresistive element. A particularly homogeneous force introduction is possible as a result. Furthermore, the diameter of the end of the punch can be designed smaller than the resistor element. If, in particular, a hemispherical force-transferring element is used between the punch and the piezoresistive element, a homogeneous force introduction onto the piezoresistive element is achieved in a particularly simple way. Either the tip of the punch or the force-introducing part may consist of a relatively soft material. As a result, a multipart design of the punch can be avoided. This design is conceivable with and without impressing of the parts punch, force- introducing part and overglazing of the piezoresistive element, since a homogeneous force introduction onto the piezoresistive element is possible with the only approximately punctiform bearing of the force-introducing part on the punch.

By welding the diaphragm to the punch, measuring errors due to an undefined force introduction can be avoided. A punch guidance with little play, of for example 0.01 mm $\leq$ punch diameter $\leq$ 0.1 mm, also contributes to this. If the piezoresistive element comprises a plurality of resistive films layered one on top of the other, its thickness increases. If these superposed resistive films have a pyramidal form, so that the edges do not overlap, adjusting inaccuracies of the resistive films or measuring errors in the edge region, occurring due to overlapping of the edges of the resistive films, can be prevented. Furthermore, force introduction exclusively into the region of the uppermost film in a defined manner is possible, since the great thickness of the resistor built up in a plurality of layers prevents the punch, which is uneven due to the way in which it is produced, also resting in areas alongside the resistor and prevents force bypasses being able to develop there. Furthermore, a temperature compensation of the piezoresistive measuring element can be effected by wiring a plurality of resistors in a Wheatstone bridge circuit. In that case, only some of the resistor elements of the bridge are exposed to the pressure and the others are shielded from the pressure, arranged in the direct vicinity of the other resistive films. Such an arrangement can be realised in a particularly simple way by the thick-film technique. Since this allows electronic components for temperature compensation to be dispensed with, the elaboration and overall size of the electronic evaluation circuit are reduced. As a result, the pressure sensor is relatively small in construction. It is consequently of a particularly simple and reliable design which can be produced cost-effectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
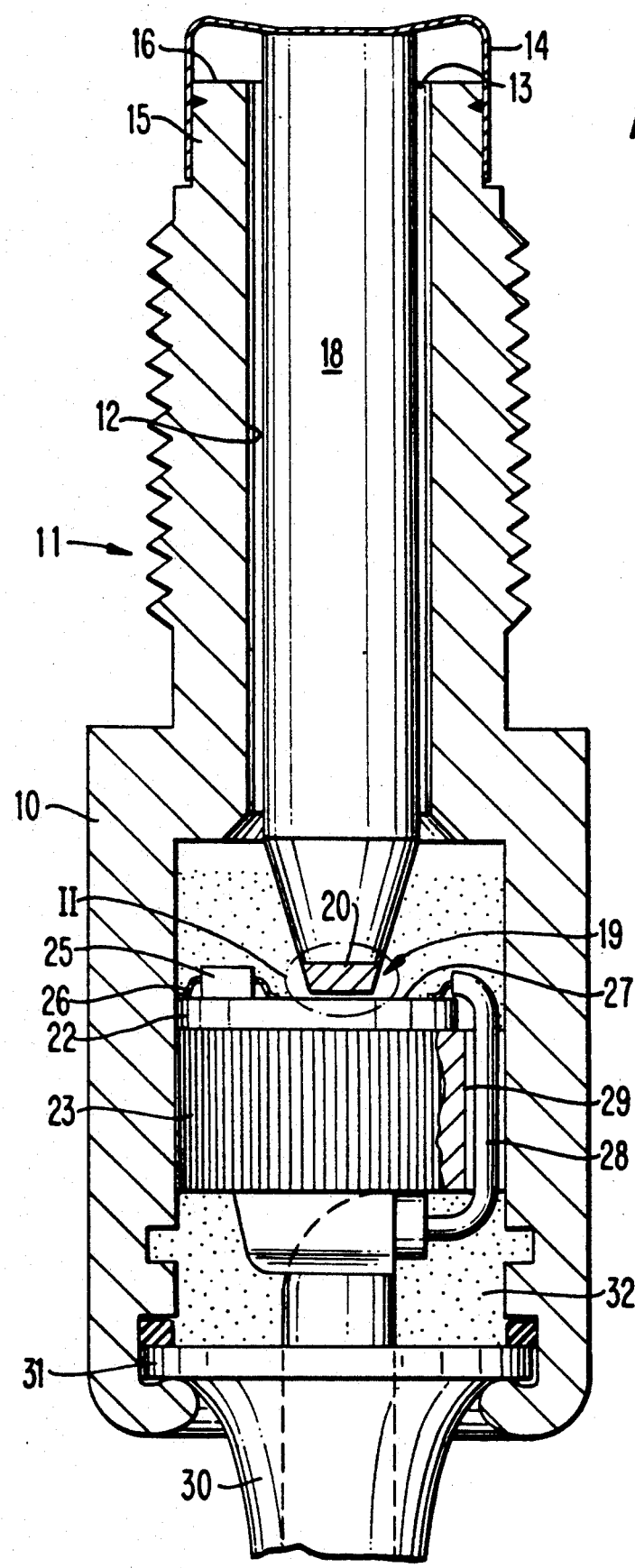
FIG. 1 shows a section through a pressure sensor.

In FIG. 1, 10 denotes the housing of a pressure sensor 11 for determining the pressure in the combustion chamber of an internal-combustion engine. It has a central, continuous stepped bore 12. The opening 13 of the housing 10 facing the combustion chamber is closed off by a diaphragm 14. The diaphragm 14 is designed as a so-called cap diaphragm, the edge of the diaphragm 14 being bent around and pushed over the end of the shank 15 of the housing 10. As a result, the diaphragm 14 sits firmly on the housing 10 but, in order to ensure a mobility of the diaphragm 14, does not bear directly against the end face 16 of the shank 15. As a result, the bending region of the diaphragm 14 can move freely. The diaphragm 14 is welded onto the shank 15 in the region of the edge. The diaphragm 14 is formed particularly advantageously from a superalloy, that is to say from an alloy of, for example, 50% Ni, 20% Cr, 20% Fe. Against the middle area of the diaphragm 14 there bears with its one end a punch 18, which with its other end bears against a piezoresistive measuring element 19. The end of the punch 18 may be welded onto the diaphragm 14, in order to permit a good and accurate force introduction. It is also possible, however, just to press the punch 18 onto the diaphragm 14. Furthermore, the punch 18 may be guided with little play of, for example, 0.01 mm $\leq$ the diameter of the punch $\leq$ 0.1 mm in the bore 12. The end of the punch 18 facing the piezoresistive measuring element 19 may be conically designed. This conical design of the end of the punch 18 may be necessary in order to match the congruent surfaces of the piezoresistive measuring element 19 and of the end of the punch 18 approximately to each other. If, on the other hand, the entire punch were to be reduced in its diameter, the punch could possibly break off during pressure transfer. In order to ensure as defined a force introduction as possible from the punch onto the piezoresistive measuring element 19, the punch 18 is produced from a relatively soft material, at least in the end region 20. This makes it possible for surface roughnesses and unevennesses of the end of the punch to be prevented from having the effect of measuring errors in the piezoresistive measuring element 19 by thus achieving a form fit between the end face of the end of the punch and the surface of the piezoresistive measuring element. Furthermore, it would also be conceivable to produce the entire punch 18 from a soft material. This would, however, in turn adversely affect the rigidity of the punch 18. When selecting the material for the punch 18 it must also be taken into consideration that the punch is to have as low a thermal conductivity as possible, so that the measuring signals are not falsified by temperature fluctuations at the diaphragm due to the temperature of the flame front. Glass ceramic, for example, has a good low thermal conductivity. Relatively soft metal, for example Al, brass, Cu, plastic etc. may be used for example as material for the region 20 of the punch 18. The material for the region 20 need not have low thermal conductivity.

The piezoresistive element is arranged on a hybrid 22, which bears against a counterbearing 23, pressed into the bore 12. The base of the hybrid 22 consists of an $Al_2O_3$ substrate, which is adhesively bonded onto the end face of the counterbearing 23. As well as the piezoresistive measuring element 19 on the same side of the base of the hybrid 22 are also the electronic components 25 of the evaluation circuit, such as for example resistors, transistors etc. The electronic semiconductor components 25 and the piezoresistive measuring element 19 are connected with the aid of bonding wires 26 and thick-film conductor tracks 27. The output of the preprocessing circuit is led via a lead 28 to an evaluation circuit and control device (not shown) of the internal-combustion engine. For this, the counterbearing 23 has a continuous bore 29, which runs approximately axially parallel to the bore 12 and in which the outgoing lead 28 is guided. The lead 28 is fastened in a grommet 30 of the cover 31 closing off the bore 12. For protection against harmful environmental influences, such as for example moisture, the bore 12 can be filled in the region of the piezoresistive measuring element 19 and of the electronic components 25 and in the region between the counterbearing 23 and the cover 31 with a casting compound 32.

Instead of a bore 29, a segment may also be cut out on the counterbearing 23 for guiding through the lead 28. The counterbearing 23 may also, however, be screwed into a bore 12 of the housing 10.

Figure 2:
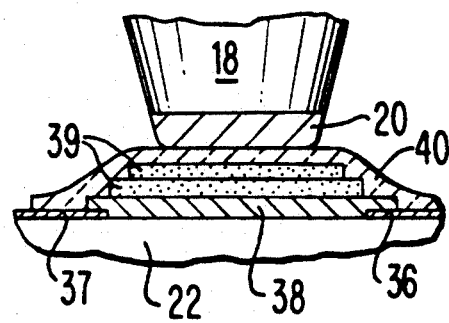
FIG. 2 shows a detail and
FIG. 3 shows a second exemplary embodiment.

In FIG. 2, the design according to the invention of the piezoresistive measuring element is shown. A first conductor track 36 and a second conductor track 37 are printed on the base of the hybrid 22 of $Al_2O_3$ substrate. Printed on between the two conductor tracks 36, 37 is a first resistive film 38, the ends of the resistor run 38 overlapping with the ends of the two conductor tracks 36, 37, in order to establish an electric contact. Printed onto this first resistor run 38 in a layer-like manner are a plurality of further resistor runs 39. These further resistor runs are arranged here in such a way that a kind of pyramid is produced, which means that the resistors are in each case of shorter design in ascending sequence of the layers and consequently are not congruent or do not overlap in the edge region. The entire pyramidal arrangement of the resistor runs 38, 39 and at least the ends of the conductor tracks are covered by a glass layer 40, produced from a glass paste, in order to achieve an electrical and mechanical insulation. The end of the punch 18 rests with its region 20 on the glass layer 40 or on the last of the resistor runs 39 in such a way that the punch 18 is placed quite centrally on this resistor run 39 only. This means that the force is introduced exclusively in the region of the uppermost resistive film and force bypasses are thus avoided.

It is also possible, however, instead of a single piezoresistive measuring element of a pyramidal design, to arrange additionally a further piezoresistive measuring element on the hybrid 22 or even 4 measuring elements. In this case, these resistor elements are wired to one another in a Wheatstone half-bridge or full-bridge circuit. One of the two or 1 to 2 of four piezoresistive measuring elements is then subjected to pressure by the punch 18, while the other piezoresistive measuring element or 2 to 3 other measuring elements are arranged as closely as possible in the region of the first or the two first piezoresistive measuring elements, but are not subjected to pressure. This makes it possible to carry out a temperature compensation without having to provide additional electronic components for a compensation of temperature fluctuations in the evaluation circuit.

The various resistor runs 38, 39 may be printed in or transversely to the direction of the current flowing through the resistor runs.

For a particularly homogeneous force introduction onto the piezoresistive element 19, the punch 18 is to be pressed with its soft tip onto the piezoresistive element 19 and here in particular onto the glass layer 40. The pressure for this should be greater than the pressure later to be determined. For this, a multiple of the maximum pressure may be applied to the diaphragm and the punch or else the intended position deliberately over-pressed when pressing in the counterbearing 23. This produces an impressing of the soft end 20 of the punch.

Particularly good measured values are possible by the arrangement according to the invention of the piezoresistive element 19. Furthermore, a particularly simple assembly of the pressure sensor 11 is possible by the arrangement of the components 25 on a hybrid 22. The piezoresistive element 19, the electronic components 25 and the counterbearing 23 can already be preassembled with the outgoing leads 28 as a structural unit outside the housing 10. Consequently, the components 25 and the piezoresistive measuring element 19 can be checked for their serviceability already when outside the housing 10 of the pressure sensor 11. During final assembly, consequently all that needs to be done is to push the preassembled, already checked unit from an opening of the bore 12 into the housing 10 with the already inserted punch 18, until it bears against the punch 18 and the latter bears against the diaphragm 14. Since the counterbearing 23 is pressed into the housing 10, the unit is easily centred and fixed in the housing 10.

Figure 3:
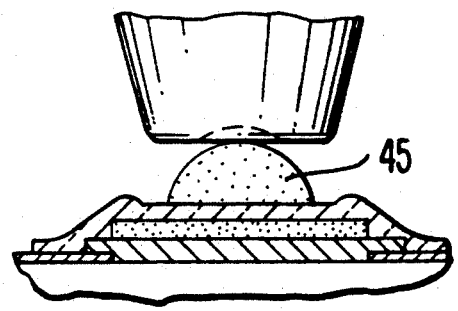

In the exemplary embodiment according to FIG. 3, an additional force-introducing part 45 is arranged between the punch 18 and the piezoresistive element 19. This force-introducing part 45 has on the side facing the punch 18 a curved surface, in particular it may be hemispherically designed. Either the punch tip 20 or the force-introducing part 45 should consist of relatively soft material. Due to the curved surface of the force-introducing part 45, a virtually punctiform bearing of the force-introducing part 45 against the punch 18 and a homogeneous force introduction onto the piezoresistive element 19 are achieved. This exemplary embodiment according to FIG. 3 can be produced and used with or without impressing during assembly. No extensive adjustment of the punch 18 on the piezoresistive element 19 is required. In order to prevent slipping of the force-introducing part 45 during assembly, both with respect to the punch 18 and with respect to the piezorestive element 19, at least one of these contact surfaces may be adhesively bonded or glazed.

It will be understood that each of the elements described above, or two or more together, may also find a useful application in other types of constructions differing from the types described above.

While the invention has been illustrated and described as embodied in a pressure sensor for detecting the pressure in the combustion chamber of internal-combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure sensor for detecting pressure in a combustion chamber of internal combustion engines, comprising a housing; a sensor element arranged in said housing and composed of a piezoresistive material; a diaphragm; and a punch arranged between said diaphragm and said sensor element and introducing a pressure to be determined onto said sensor element; said punch having an end facing said sensor element, at least said end of said punch being composed of relatively soft material.

2. A pressure sensor as defined in claim 1; and further comprising a force-transferring part located between said punch and said sensor element, said force-transferring part forming said end of said punch and being composed of said relatively soft material.

3. A pressure sensor as defined in claim 2, wherein said force-transferring part is formed as a hemisphere.

4. A pressure sensor as defined in claim 2, wherein said sensor element is impressed with said punch during assembly under the action of a pressure exceeding the pressure to be measured, so that after assembly an uninterrupted form-fit of said pressure-transferring part with said sensor element is produced.

5. A pressure sensor as defined in claim 1, wherein said sensor element is impressed with said punch during assembly under the action of a pressure exceeding the pressure to be measured, so that after assembly an uninterrupted form-fit of the end of said punch with said element is produced.

6. A pressure sensor as defined in claim 1, wherein said piezoresistive element has a plurality of resistive films which are printed one on top of the other.

7. A pressure sensor as defined in claim 6, wherein said resistive films are arranged one on top of the other in a pyramid-like manner.

8. A pressure sensor as defined in claim 6; and further comprising an electrically insulating glass layer which covers said resistive films.

9. A pressure sensor as defined in claim 8; and further comprising a force-transferring part arranged between said punch and said sensor element, said force-transferring part and glass layer being glazed to each other.

10. A pressure sensor as defined in claim 1, wherein said punch and said diaphragm are welded to each other.

11. A pressure sensor as defined in claim 1, wherein said punch is composed of glass ceramic.

12. A pressure sensor as defined in claim 1, wherein said punch is composed of metal.

13. A pressure sensor as defined in claim 1, wherein said punch is guided in a sliding manner in said housing.

14. A pressure sensor as defined in claim 1, wherein said punch has another end facing said diaphragm, said first mentioned end of said punch facing said sensor element having a smaller diameter than said end of said punch facing said diaphragm.

15. A pressure sensor as defined in claim 1, wherein said sensor element has an uppermost resistor run, said end of said punch facing said sensor element having a smaller diameter than said uppermost resistor run.

* * * * *